United States Patent [19]

Wefler

[11] 4,349,951
[45] Sep. 21, 1982

[54] METHOD OF MAKING A KEY RING BOB

[76] Inventor: Michael W. Wefler, P.O. Box 524, Hobard, Ind. 46342

[21] Appl. No.: 204,567

[22] Filed: Nov. 6, 1980

[51] Int. Cl.³ .................... B23P 23/00; B23P 17/04; B21K 21/16
[52] U.S. Cl. .................... 29/401.1; 29/525; 63/23; 70/457
[58] Field of Search ............... 29/401.1, 525; 70/457; 63/21, 22, 23

[56] References Cited

U.S. PATENT DOCUMENTS

| | | | |
|---|---|---|---|
| D. 128,625 | 8/1941 | Fischer | 70/457 UX |
| 491,382 | 2/1893 | Stahl et al. | 63/23 |
| 1,074,673 | 10/1913 | Weiss | 63/23 X |
| 1,997,297 | 4/1935 | Fuchs | 29/525 X |
| 2,494,290 | 1/1950 | Erhard | 25/525 X |
| 2,599,660 | 6/1952 | Poutinen | 70/457 X |
| 2,885,532 | 5/1959 | Fike | 29/525 X |
| 2,901,903 | 9/1959 | Grace | 70/457 |
| 3,093,435 | 6/1963 | Johnson | 29/525 X |
| 4,010,533 | 3/1977 | Pitner | 29/525 X |
| 4,149,305 | 4/1979 | Blumhof | 70/457 X |

FOREIGN PATENT DOCUMENTS

| | | | |
|---|---|---|---|
| 7068 | of 1900 | United Kingdom | 29/401.1 |
| 132702 | 9/1919 | United Kingdom | 29/401.1 |

*Primary Examiner*—Charlie T. Moon
*Attorney, Agent, or Firm*—Oltsch, Knoblock & Hall

[57] ABSTRACT

A method of making a key ring bob from a shell casing and bullet head.

2 Claims, 1 Drawing Figure

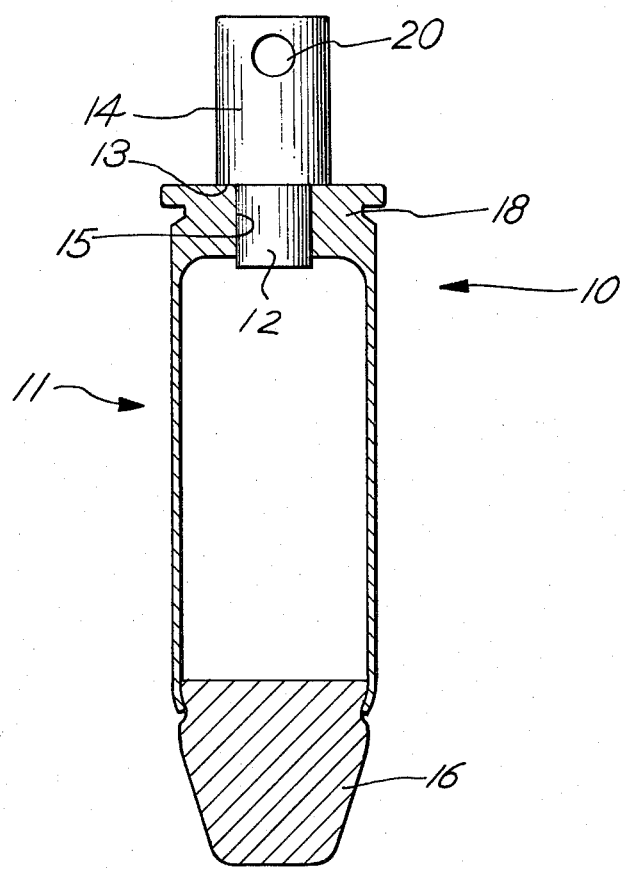

METHOD OF MAKING A KEY RING BOB

SUMMARY OF THE INVENTION

This invention relates to a method of making a key ring bob.

A more specific embodiment of the product of this invention is a key ring bob made from a shell casing, a bullet head, and a rod connected to the casing whereby the bob is connected to a key ring through a transverse hole in the rod. Heretofore, the method of making bobs of this type has been to provide a shell casing, a shaft, and a bullet head. A lip or flange is formed at one end of the shaft and a transverse bore is formed at the other end. The casing has a hole drilled in its end wall through which the shaft is inserted from the inside of the casing so that the shaft lip rests against the inside of the casing end wall. The opposite end of the shaft projects with clearance through the casing end wall and is retained therein by the attachment of a key ring through a transverse bore in the shaft. The bullet head is then pressed into the open end of the shell casing. This method is costly and time consuming due to the forming of the lip on the shaft and the difficulty of putting the shaft through the hole in the casing end wall from the inside of the casing.

The method of this invention utilizes a shell casing, a rod, and a bullet head. A hole is drilled in the end wall of the casing at the primer well. The rod has a transverse bore at one end for attaching a key ring. The opposite end of the rod is pressed into the hole drilled in the casing end wall in a force fit and the bullet head is pressed into place at the opposite end of the casing. This method is simpler and less expensive.

Accordingly, it is an object of this invention to provide a simple method of making a key chain bob.

Another object of this invention is to provide an inexpensive method of making a key chain bob.

Still another object of this invention is to provide a method of making bullet key chain bobs which is less time consuming than methods previously employed.

Other objects of this invention will become apparent upon a reading of the following description.

BRIEF DESCRIPTION OF THE DRAWINGS

An embodiment of the invention has been chosen and illustrated in a drawing wherein a longitudinal sectional view of the key chain bob is shown.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The key chain bob 10 shown in the drawing is formed upon completion of the process of this invention. Such process involves the provision of three pieces: (1) a shell casing 11 which includes a thickened end wall 18 having a primer well formed in it and a side wall 12 which is open at the opposite end; (2) a bullet head 16, and (3) a rod 14 of brass or similar material having a transverse bore 20 at one end and a reduced end portion 12 defining a shoulder 13 at the other end.

Key chain bob 10 is formed by first enlarging the primer well opening of end wall 18 to an opening having a bore of the relative size indicated at 15 of the drawing. The end or rod end portion 12 adjacent shoulder 13 is pressed into bore 15 until shoulder 13 abuts the outside surface of end wall 18. The relative diameters of end portion 12 of rod 14 and bore 15 in casing 11 are such that when rod 14 is pressed into bore 15 the parts are joined in a force fit with an interference of preferably between 0.002 and 0.003 inches. Bullet head 16 is then press fit into the end opening of side wall 12.

The above described process provides a simple, quick and inexpensive method of making a key chain bob.

It is understood that the invention is not to be limited to the details above given but may be modified within the scope of the appended claims.

What I claim is:

1. A method for producing a key chain bob with a bullet shape comprising the steps of:
   (a) providing a shell casing having a thickened end wall forming a primer well and a side wall having an open end;
   (b) providing a rod having a transverse bore through one end;
   (c) providing a bullet head for said casing;
   (d) boring a hole in said casing end wall at said primer well to enlarge the opening of the primer well;
   (e) pressing the opposite end of said shaft into said enlarged end wall hole in a force fit; and
   (f) seating said bullet head into said side wall open end.

2. The method of claim 1 wherein said rod has a reduced end portion at said opposite end forming a shoulder, and step (e) includes pressing said rod into said enlarged end wall hole until said shoulder abuts the outside of said casing end wall.

* * * * *